United States Patent [19]

Aragon

[11] 4,150,798
[45] Apr. 24, 1979

[54] CORD AND LINE STORAGE REEL

[76] Inventor: Manuel Y. Aragon, 125 Grijalva Dr., San Francisco, Calif. 94132

[21] Appl. No.: 823,413

[22] Filed: Aug. 10, 1977

[51] Int. Cl.² .............................................. B65H 75/38
[52] U.S. Cl. .............................. 242/100.1; 191/12.2 R
[58] Field of Search ............... 242/100.1, 96, 77, 107; 24/71.2; 191/12.2 R

[56] References Cited

U.S. PATENT DOCUMENTS

| | | | |
|---|---|---|---|
| 2,201,305 | 5/1940 | Springer | 242/96 |
| 2,521,226 | 9/1950 | Keller | 242/100.1 |
| 2,565,339 | 8/1951 | Anderson | 242/100.1 |
| 2,576,335 | 11/1951 | Fanslow | 24/71.2 X |

*Primary Examiner*—Edward J. McCarthy
*Attorney, Agent, or Firm*—J. L. Jones, Sr.

[57] ABSTRACT

Each one of a pair of mating telescoping circular reel half sections have a slot aperture bisecting each reel half section, excluding a central alignment and indexing hub formed by each one of the mating reel half sections. The mating pair of half sections are secured together by compression of the grooved semi-rigid rims of the pair, the flexible rims having a pair of circular mating grooves disposed in the pair of semi-rigid rim periphery. An electric cord or line is disposed across the hub of the indexed pair of the bisecting slot apertures of the pair of reel half sections, which are then compressed together. The pair of reel half sections are oppositely rotated, winding the electric cord or line inside the reel on the reel hub.

2 Claims, 4 Drawing Figures

CORD AND LINE STORAGE REEL

BACKGROUND OF THE INVENTION

Typically, in U.S. Pat. No. 3,809,331, issued May 7, 1974, Gaul discloses an electric cord coiler having a hub member journaled on the spaced end walls of a hollow housing and carrying a partition in the form of an annular plate to separate the housing interior into two axially separate spaces. The hub member has a diametrical passage which can carry a portion of the electric cord intermediate to the cord ends. The cord is wound on the hub member. Kasa, in U.S. Pat. No. 3,782,654 issued Jan. 1, 1974, discloses a plastic housing having a winding shaft releasably secured therein with a plate retained by the shaft dividing the housing into an upper and lower section. The electric cord is disposed in a slot in the winding shaft and wound on the shaft. Price, in U.S. Pat. No. 3,208,121 issued September 28, 1965, discloses a housing having a hub and a annular partition plate disposed in the housing on a hub means. The reel can store and release electric cords, rope lines and the like from either cord or line ends.

SUMMARY OF THE INVENTION

Electric cord, rope line, tubing or the like, is easily wound and stored on the core and line storage reel of this invention. A pair of telescoping reel half sections each have a slot aperture bisecting each round reel half section, excluding a central alignment and indexing hub member formed by the central area of each reel half section. A first circular alignment cylindrical hub member is disposed across the bisecting slot aperture of a first reel half section and the circular cylindrical hub member has the bisecting slot aperture disposed therein the reel half section. A second circular alignment cylindrical hub member of a second reel half section indexes in the first hub member. The exterior semi-rigid rims of the pair of reel half sections have a circular mating groove in each one of their rims, and the rims can flex on compression, providing a groove locking means securing the two real half sections into a single reel housing, aligning the hub members. In using the assembled storage reel, the pair of slot apertures are indexed, and the cord or line is disposed in the hub slot aperture of the aligned pair of slot apertures. The two reel half sections are then rotated on the reel hub in opposed direction, winding the cord or line on the reel hub and into the reel housing.

Included in the objects of this invention are:

To provide a simple two piece storage reel for electric cords, ropes, tubing, and the like.

To provide a simple storage reel which can begin a storage operation, using the reel at any point on the length of the cord, rope, tubing, or the like.

To provide a simple storage means for electric cord, rope, hoses, or the like, preventing them from becoming entangled.

Other objects and advantages of this invention are taught in the following description and claims.

DESCRIPTION OF THE PREFERRED EMBODIMENT OF THE INVENTION

Figure 1:
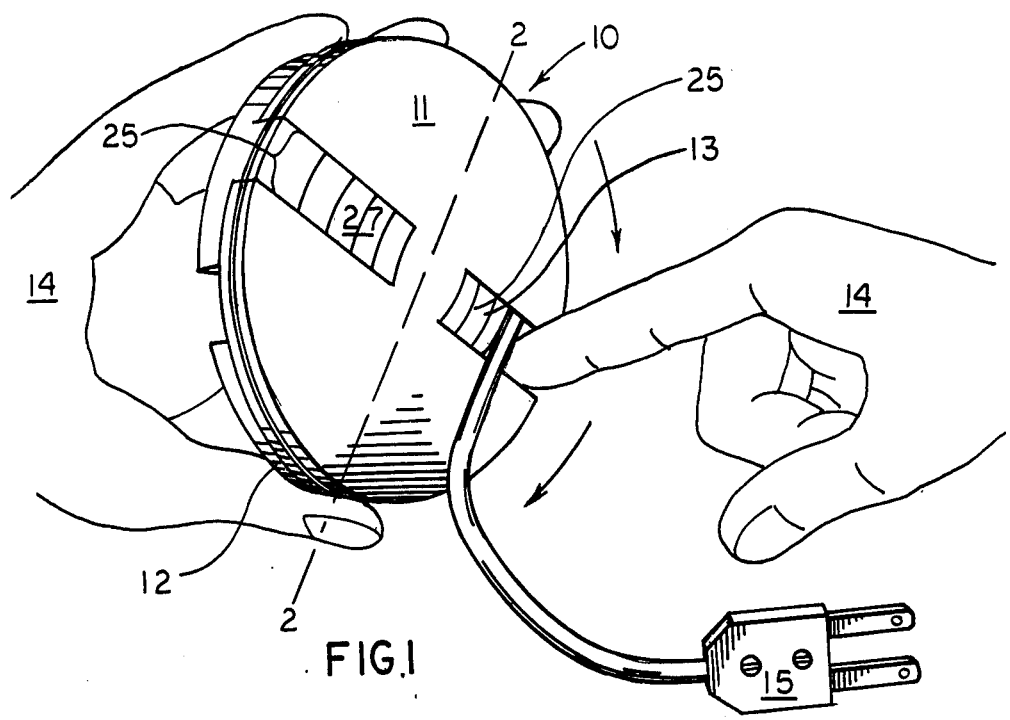
FIG. 1 is a perspective view of the cord and line storage reel of the invention, assembled and operative.
Figure 4:
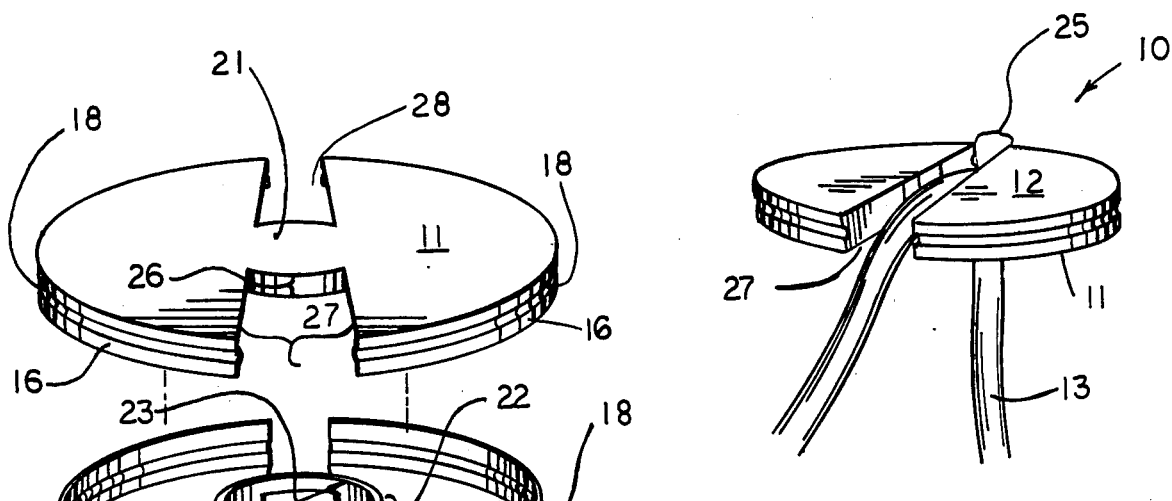
FIG. 4 is an exploded perspective view of the cord and line storage reel of this invention, illustrating the two components of the reel.

Referring to FIG. 1 in detail, the cord and line storage reel 10 is shown in a perspective view having an electric cord 13 wound on reel 10 by the user's hands 14. The storage reel 10 has two reel half sections, a first reel half section 11 and a second reel half section 12, which are shown telescoped together as the operating storage reel 10. The electric prong plug 15 indicates the electric cord 13 can be wound on the reel 10 at a mid-section of cord 13.

Figure 2:
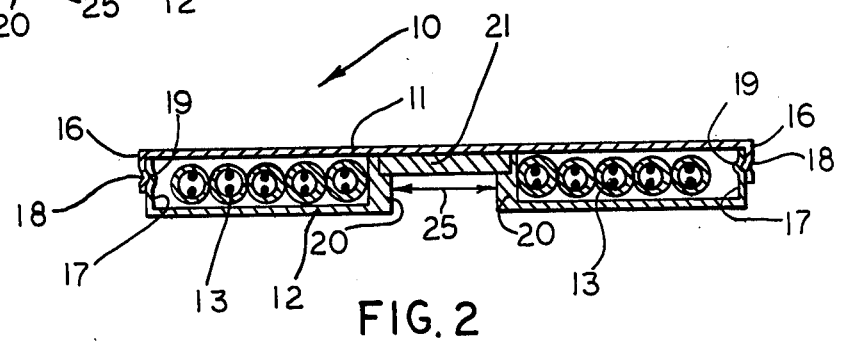
FIG. 2 is an assembled reel of the invention in cross section view through 2—2 of FIG. 1, illustrating the two piece reel construction.

The FIG. 2 illustrates a cross section through 2—2 of FIG. 1 wherein the cord 13 is wound and disposed inside the two piece reel 10, formed by telescoping the first reel half section 11 onto the second reel half section 12, indexing the first reel half section rim 16 outside the second reel half section rim 17. The rim 16 is flexible and has a semi-circular groove 18 disposed around the periphery of the rim 16. The rim 17 also has a semi-circular groove 19 disposed around the periphery of the rim 17. The groove 18 and the groove 19 are sized and adapted to mate and secure the rims 16 and 17 together. The electric cord 13 is shown, wound inside the reel 10.

Also illustrated in FIG. 2 is the pair of mating hub members. The hollow cylindrical hub member 20 is shown as an integral part of reel half section 12 and having a selected height 22 not greater than the height 24 of the rim 17. The internal diameter 23 of the cylindrical hub 20 is shown. The width 25 of the slot aperture is shown uniformly disposed across the full diameter of reel half sections 11 and 12, the slot aperture 27 also being disposed across the hub member 20.

The reel half section 11 is also shown, having a solid core hub member 21 circular and adapted to mate into the inner cylinder diameter 23 of hub member 20. The slot aperture 28 has the same width 25, as the slot aperture 27. The thickness 26 of hub member 21 is sized to unobstruct slot aperture 27.

Figure 3:
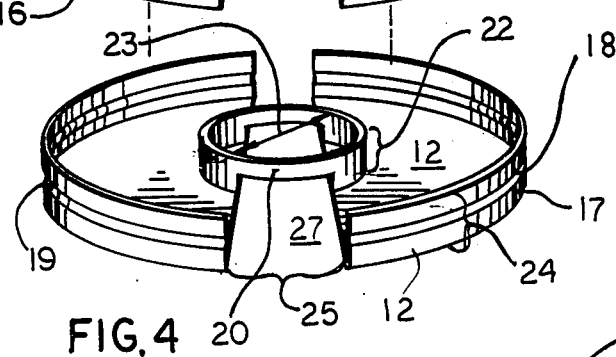
FIG. 3 is a perspective view of an assembled reel of this invention, illustrating the means of securing a cord or line to the reel.

Operatively, in FIG. 3 the electric cord 13 is shown disposed across the slot aperture 27, having the slot aperture width 25. The cord 13 can be any section of the cord length. The two reel half sections 11 and 12 of reel 10 are centered and telescoped together, and wound in opposite directions by hand to store the electric cord 13 inside reel 10.

Cylindrical hollow hub member 20 can also be integrally disposed on the reel half section having the exterior rim equivalent of rim 16.

The material of construction of the first and second reel half sections 11 and 12 can be a plastic, such as polyethylene, polypropylene, or ABS. Likewise the material can be a thin metal sheet structure such as aluminum or steel. The dimensions of the reel can be the desired values required for the electric cord, hose, tubing or rope to be stored therein.

Many modifications in the cord and line storage reel can be made in the light of my teachings. It is understood that within the scope of the claims, the invention can be practiced otherwise than as described.

I claim:

1. In a storage reel suitable for storing electric cord, rope, lines and tubing, the combination comprising:
   a pair of circular reel half sections comprising a first reel half section and a second reel half section telescoped together, providing a storage reel,
   said first reel half section having an integral hub member, circular in shape, said reel half section having a first slot aperture bisectingly disposed the full diameter across said first half section and having a required slot width, said first half section having a flexible rim with a groove formed in and disposed around the full rim periphery,
   said second reel half section having an integral hub member, circular in shape and mating with said first half section hub member, said second reel half section having a second slot aperture bisectingly disposed across the full diameter of said half section including aforesaid hub member, said second reel half section having a flexible rim with a groove formed therein and disposed around the full rim periphery,
   aforesaid flexible rims of said first half section and said second section sections are sized and adapted to telescope together and lock the pair of rim grooves of said first and second half sections,
   aforesaid integral hub members of said first half section and said second half section are sized and adapted to telescope together and mate, and provide a pair of a first and second slot apertures of equivalent width, and,
   whereby when aforesaid first reel half section and aforesaid second reel half section are telescoped together, mating aforesaid flexible rims and aforesaid hub members, and the pair of reel half sections are rotated to place aforesaid pair of first and second slot apertures in coincidence, and after placing an electric cord across aforesaid slot first and second apertures and aforesaid mated hub members, the mated first reel half section is rotated in an opposed direction to aforesaid second reel half section winding said cord inside said storage reel.

2. In the combination set forth in claim 1, the further modification wherein the storage reel is comprised of polyethylene, polypropylene and ABS.